(12) United States Patent
Bergholz, Jr. et al.

(10) Patent No.: US 9,145,773 B2
(45) Date of Patent: Sep. 29, 2015

(54) ASYMMETRICALLY SHAPED TRAILING EDGE COOLING HOLES

(75) Inventors: Robert Frederick Bergholz, Jr., Loveland, OH (US); Daniel Lee Durstock, Fort Wright, KY (US)

(73) Assignee: General Electric Company, Schenectady, NY (US)

( * ) Notice: Subject to any disclaimer, the term of this patent is extended or adjusted under 35 U.S.C. 154(b) by 684 days.

(21) Appl. No.: 13/470,792

(22) Filed: May 14, 2012

(65) Prior Publication Data

US 2013/0302178 A1 Nov. 14, 2013

Related U.S. Application Data

(60) Provisional application No. 61/645,008, filed on May 9, 2012.

(51) Int. Cl.
*F01D 5/18* (2006.01)
(52) U.S. Cl.
CPC .............. *F01D 5/187* (2013.01); *F01D 5/186* (2013.01); *F05D 2240/122* (2013.01); *F05D 2240/304* (2013.01); *F05D 2250/14* (2013.01);
(Continued)

(58) Field of Classification Search
CPC .................... F05D 2250/323; F05D 2250/324; F05D 2260/22141; F05D 2260/202; F05D 2240/304; F05D 2240/122; F01D 5/187; F01D 5/188; F01D 5/18; F01D 5/189; Y02T 50/676
See application file for complete search history.

(56) References Cited

U.S. PATENT DOCUMENTS

| 4,303,374 A | 12/1981 | Braddy |
|---|---|---|
| 4,601,638 A | 7/1986 | Hill et al. |

(Continued)

FOREIGN PATENT DOCUMENTS

| CN | 1851239 A | 10/2006 |
|---|---|---|
| CN | 101358545 A | 2/2009 |

(Continued)

OTHER PUBLICATIONS

PCT Search Report and Written Opinion dated Jan. 22, 2014, issued in connection with corresponding WO Patent Application No. PCT/US2013/040281.

(Continued)

*Primary Examiner* — Edward Look
*Assistant Examiner* — Juan G Flores
(74) *Attorney, Agent, or Firm* — General Electric Company; William Scott Andes (57) ABSTRACT

A turbine airfoil includes pressure and suction sidewalls extending along a span from a base to a tip. Spanwise spaced apart trailing edge cooling holes in pressure sidewall end at corresponding spanwise spaced apart trailing edge cooling slots extending chordally substantially to trailing edge. Each cooling hole includes an asymmetric flow cross section through one or more asymmetric intermediate sections leading into slot. Flow cross section is asymmetric with respect to a mid-plane extending axially and spanwise through intermediate sections. Different trailing edge cooling holes may include different asymmetric flow cross sections. Lands may extend between the cooling slots. A raised floor may extend away from at least one of pressure or suction sidewalls at least partially through one or more asymmetric intermediate sections and optionally at least partially through cooling slot. Raised floor may include up and down ramps and a flat transition section between ramps.

11 Claims, 9 Drawing Sheets

(52) U.S. Cl.
CPC ..... *F05D2250/323* (2013.01); *F05D 2250/324* (2013.01); *F05D 2260/202* (2013.01); *F05D 2260/22141* (2013.01); *Y02T 50/673* (2013.01); *Y02T 50/676* (2013.01)

(56) References Cited

U.S. PATENT DOCUMENTS

| | | | |
|---|---|---|---|
| 5,243,759 A * | 9/1993 | Brown et al. | 29/889.721 |
| 5,368,441 A | 11/1994 | Sylvestro et al. | |
| 5,503,529 A | 4/1996 | Anselmi et al. | |
| 5,931,638 A | 8/1999 | Krause et al. | |
| 6,402,470 B1 | 6/2002 | Kvasnak et al. | |
| 6,612,811 B2 | 9/2003 | Morgan et al. | |
| 6,616,406 B2 | 9/2003 | Liang | |
| 6,969,230 B2 | 11/2005 | Shi et al. | |
| 7,246,999 B2 | 7/2007 | Manning et al. | |
| 7,371,048 B2 | 5/2008 | Downs et al. | |
| 7,438,527 B2 | 10/2008 | Albert et al. | |
| 8,096,771 B2 | 1/2012 | Liang | |
| 2006/0133936 A1 | 6/2006 | Papple | |
| 2010/0074763 A1* | 3/2010 | Liang | 416/97 R |
| 2011/0097191 A1 | 4/2011 | Bunker | |
| 2013/0205786 A1 | 8/2013 | Kohli et al. | |
| 2013/0205787 A1 | 8/2013 | Zelesky et al. | |
| 2013/0205791 A1 | 8/2013 | Mongillo, Jr. et al. | |
| 2013/0205792 A1 | 8/2013 | Gleiner et al. | |
| 2013/0205793 A1 | 8/2013 | Xu | |
| 2013/0205794 A1 | 8/2013 | Xu | |
| 2013/0205801 A1 | 8/2013 | Xu et al. | |
| 2013/0205802 A1 | 8/2013 | Levasseur et al. | |
| 2013/0205803 A1 | 8/2013 | Xu | |
| 2013/0206733 A1 | 8/2013 | Levasseur et al. | |
| 2013/0209227 A1 | 8/2013 | Xu | |
| 2013/0209228 A1 | 8/2013 | Xu | |
| 2013/0209229 A1 | 8/2013 | Xu et al. | |
| 2013/0209233 A1 | 8/2013 | Xu et al. | |
| 2013/0209234 A1 | 8/2013 | Xu | |
| 2013/0209235 A1 | 8/2013 | Xu | |
| 2013/0209236 A1 | 8/2013 | Xu | |
| 2013/0209269 A1 | 8/2013 | Gleiner et al. | |

FOREIGN PATENT DOCUMENTS

| | | |
|---|---|---|
| CN | 102052092 A | 5/2011 |
| EP | 2426317 A1 | 3/2012 |
| EP | 2568119 A2 | 3/2013 |
| WO | 2009109462 A1 | 9/2009 |
| WO | 2013180795 A2 | 12/2013 |

OTHER PUBLICATIONS

Unofficial English Translation of Chinese Office Action issued in connection with corresponding CN Application No. 20130024123.2 on Jul. 2, 2015.

* cited by examiner

ASYMMETRICALLY SHAPED TRAILING EDGE COOLING HOLES

CROSS-REFERENCE TO RELATED APPLICATIONS

The present application claims priority to U.S. Provisional Patent Application Ser. No. 61/645,008, entitled "Asymmetrically Shaped Trailing Edge Cooling Holes", filed May 9, 2012, the disclosure of which is hereby incorporated by reference.

BACKGROUND OF THE INVENTION

1. Field of the Invention

The present invention relates generally to gas turbine engine turbine airfoil cooling and, more specifically, to turbine airfoil trailing edge cooling holes leading into trailing edge cooling slots.

2. Description of Related Art

In a gas turbine engine, air is pressurized in a compressor and mixed with fuel in a combustor for generating hot combustion gases. The hot gases are channeled through various stages of a turbine which extract energy therefrom for powering the compressor and producing work, such as powering an upstream fan in a typical aircraft turbofan engine application.

The turbine stages include stationary turbine nozzles having a row of hollow vanes which channel the combustion gases into a corresponding row of rotor blades extending radially outwardly from a supporting rotor disk. The vanes and blades have corresponding hollow airfoils with corresponding cooling circuits therein.

The cooling air is typically compressor discharge air which is diverted from the combustion process and, therefore, decreases overall efficiency of the engine. The amount of cooling air must be minimized for maximizing the efficiency of the engine, but sufficient cooling air must nevertheless be used for adequately cooling the turbine airfoils for maximizing their useful life during operation. Each airfoil includes a generally concave pressure sidewall and, an opposite, generally convex suction sidewall extending longitudinally or radially outwardly along a span from an airfoil base to an airfoil tip and axially in chordwise direction between leading and trailing edges. For a turbine blade, the airfoil span extends from a root at the radially inner platform to a radially outer tip spaced from a surrounding turbine shroud. For a turbine vane, the airfoil extends from a root integral with a radially inner band to a radially outer tip integral with an outer band.

Each turbine airfoil also initially increases in thickness aft of the leading edge and then decreases in thickness to a relatively thin or sharp trailing edge where the pressure and suction sidewalls join together. The wider portion of the airfoil has sufficient internal space for accommodating various forms of internal cooling circuits and turbulators for enhancing heat transfer cooling inside the airfoil, whereas, the relatively thin trailing edge has correspondingly limited internal cooling space.

Each airfoil typically includes various rows of film cooling holes extending through the sidewalls thereof which discharge the spent cooling air from the internal circuits. The film cooling holes are typically inclined in the aft direction toward the trailing edge and create a thin film of cooling air over the external surface of the airfoil that provides a thermally insulating air blanket for additional protection against the hot combustion gases which flow over the airfoil surfaces during operation.

The thin trailing edge is typically protected by a row of trailing edge cooling holes which breach the pressure sidewall at a breakout immediately upstream of the trailing edge for discharging film cooling air into trailing edge cooling slots. Each trailing edge cooling hole has an outlet aperture in the pressure side which begins at a breakout and may or may not be bounded in the radial direction by exposed lands at aft ends of axially extending partitions which define the cooling slots.

The axial partitions may be integrally formed with the pressure and suction sides of the airfoil and themselves must be cooled by the air discharged through the cooling slots defined thereby. The partitions typically converge in the aft direction toward the trailing edge so that the cooling slots diverge toward the trailing edge with a shallow divergence angle that promotes diffusion of the discharged cooling air with little if any flow separation along the sides of the partitions.

Aerodynamic and cooling performance of the trailing edge cooling slots is directly related to the specific configuration of the cooling slots and the intervening partitions. The flow area of the cooling slots regulates the flow of cooling air discharged through the cooling slots, and the geometry of the cooling slots affects cooling performance thereof.

The divergence or diffusion angle of the cooling slots can effect undesirable flow separation of the discharged cooling air which would degrade performance and cooling effectiveness of the discharged air. This also increases losses that negatively impact turbine efficiency. Portions of the thin trailing edge directly under the individual cooling slots are effectively cooled by the discharged cooling air, with the discharged air also being distributed over the intervening exposed lands at the aft end of the partitions. The lands are solid portions of the pressure sidewall integrally formed with the suction sidewall and must rely for cooling on the air discharged from the adjacent trailing edge cooling slots.

Notwithstanding, the small size of the these outlet lands and the substantial cooling performance of the trailing edge cooling slots, the thin trailing edges of turbine airfoils nevertheless typically limit the life of those airfoils due to the high operating temperature thereof in the hostile environment of a gas turbine engine.

The pressure ratio of the cooling air to the mainstream gas in the turbine flowpath is typically highest at the trailing edge, so metering the cooling flow to the desired level is often difficult. Film cooling effectiveness must be sufficiently high on the both the slot floor or deck and the lands to maintain acceptable metal temperatures. This is significant challenge on the lands, which must rely on lateral cooling flow migration to reach the top surface.

Accordingly, it is desired to provide a turbine airfoil having improved trailing edge cooling and cooling slots for improving airfoil durability and engine performance. It is also desired to minimize the amount of cooling flow used for trailing edge cooling in order to maximize fuel efficiency of the turbine and the engine. It is also desirable to provide cooling air metering so that blowing ratio is minimized the cooling hole exit to the slot to maintain good slot floor film effectiveness, low cooling flow, and cooling film effectiveness over the land with good flow alignment with land edges along with a smaller land surface area.

SUMMARY OF THE INVENTION

A gas turbine engine turbine airfoil includes widthwise spaced apart pressure and suction sidewalls extending outwardly along a span from an airfoil base to an airfoil tip and extending chordwise between opposite leading and trailing edges. A spanwise row of spanwise spaced apart trailing edge cooling holes encased in the airfoil between the pressure and suction sidewalls end at corresponding spanwise spaced apart trailing edge cooling slots extending chordally substantially to the trailing edge. Each of the cooling holes includes one or more asymmetric intermediate sections leading into the trailing edge cooling slot and an asymmetric flow cross section. The asymmetric flow cross section is asymmetric with respect to a mid-plane extending axially and spanwise through the one or more asymmetric intermediate sections.

The airfoil different trailing edge cooling holes in the row may include different asymmetric flow cross sections. At least one raised floor may extend away from one or both of the pressure or suction sidewalls and extend downstream in and at least partially through the one or more asymmetric intermediate sections or extend downstream in and at least partially through the one or more asymmetric intermediate sections and least partially through the cooling slot. The raised floor may include in downstream serial relationship an up ramp, a down ramp, and a flat transition section between the up and down ramps.

The airfoil may further include lands disposed between spanwise adjacent ones of the trailing edge cooling slots and slot floors in the trailing edge cooling slots between the lands. The lands may be coplanar or flush with an external surface of the pressure sidewall around each of the cooling slots.

Each of the cooling holes may include in downstream serial cooling flow relationship, an inlet of the cooling holes, the one or more asymmetric intermediate sections, and the trailing edge cooling slot and the up ramp.

The one or more asymmetric intermediate sections may be a single intermediate section and a metering section including the asymmetric flow cross section.

One embodiment of the airfoil may include an inlet of the cooling hole and the one or more asymmetric intermediate sections may include a metering section and a diverging section. Each of the cooling holes include in downstream serial cooling flow relationship, the inlet, the metering section and the diverging section. At least one raised floor may extend away from one or both of the pressure or suction sidewalls and downstream in and at least partially through the metering section and at least partially through the diverging section. Alternatively the raised floor may extend downstream in and at least partially through the metering section, through the diverging section and least partially through the cooling slot.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
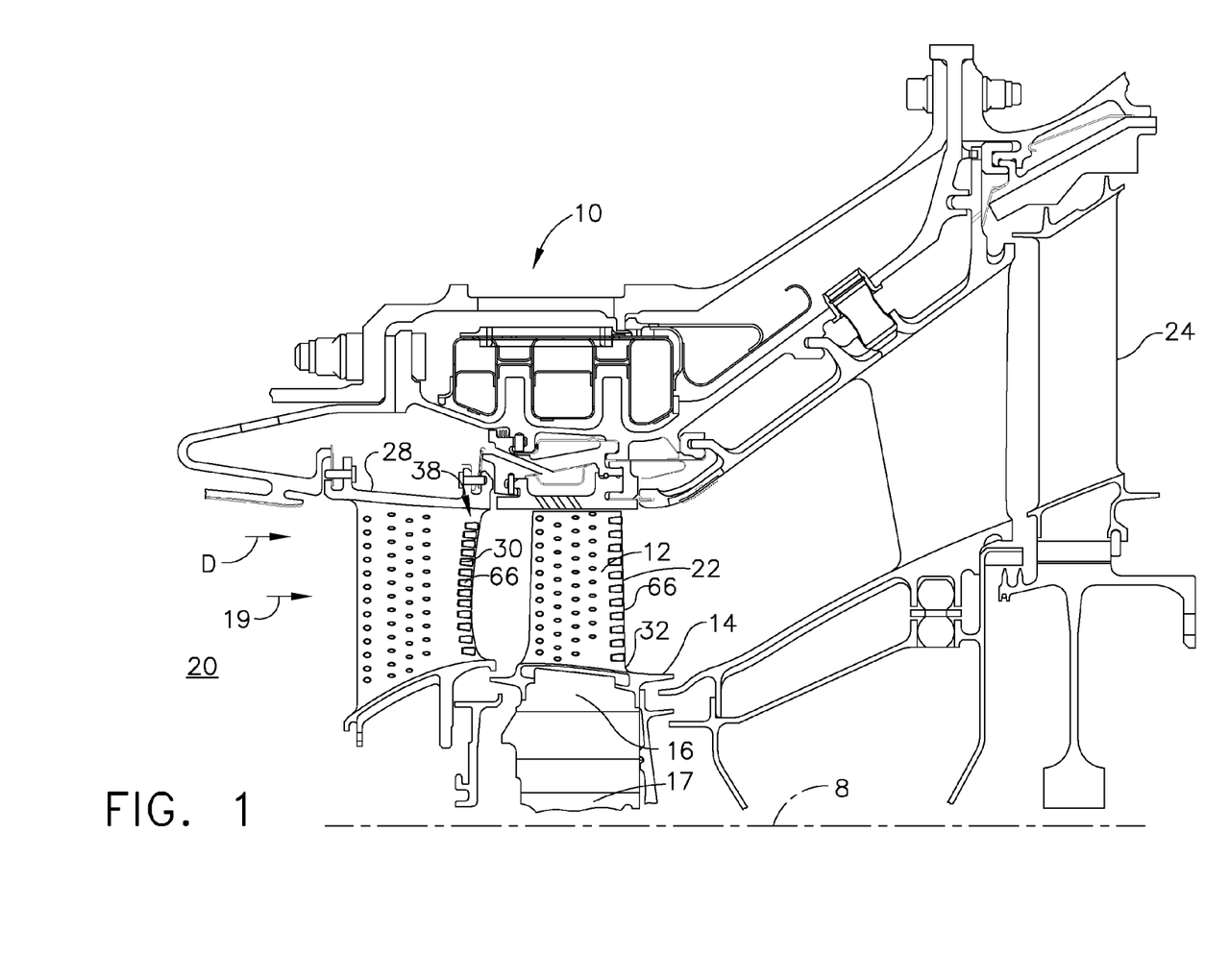
FIG. 1 is a longitudinal, sectional view illustration of an exemplary embodiment of turbine vane and rotor blade airfoils having asymmetrically shaped cooling holes culminating at spanwise spaced apart trailing edge cooling slots.

Illustrated in FIG. 1 is an exemplary gas turbine engine high pressure turbine stage 10 circumscribed about an engine centerline axis 8 and positioned between a combustor 20 and a low pressure turbine (LPT) 24. The combustor 20 mixes fuel with pressurized air for generating hot combustion gases 19 which flows downstream D through the turbines.

The high pressure turbine stage 10 includes a turbine nozzle 28 upstream of a high pressure turbine (HPT) 22 through which the hot combustion gases 19 are discharged into from the combustor 20. The exemplary embodiment of the high pressure turbine 22 illustrated herein includes at least one row of circumferentially spaced apart high pressure turbine blades 32. Each of the turbine blades 32 includes a turbine airfoil 12 integrally formed with a platform 14 and an axial entry dovetail 16 used to mount the turbine blade on a perimeter of a supporting rotor disk 17.

Figure 2:
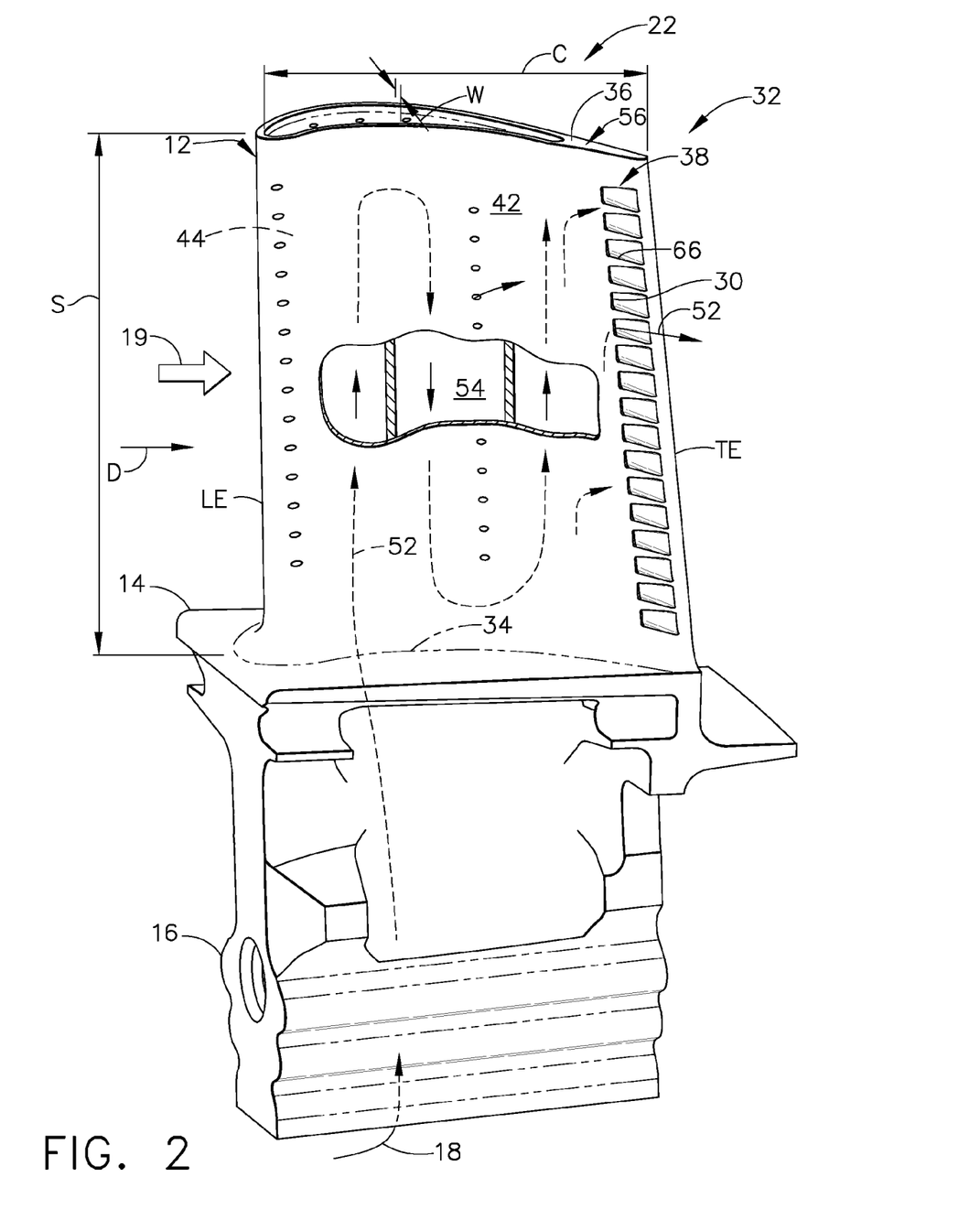
FIG. 2 is an enlarged view of a blade illustrated in FIG. 1.

Referring to FIG. 2, the airfoil 12 extends radially outwardly along a span S from an airfoil base 34 on the blade platform 14 to an airfoil tip 36. During operation, the hot combustion gases 19 are generated in the engine and flow downstream D over the turbine airfoil 12 which extracts energy therefrom for rotating the disk supporting the blade for powering the compressor (not shown). A portion of pressurized air 18 is suitably cooled and directed to the blade for cooling thereof during operation.

The airfoil 12 includes widthwise spaced apart generally concave pressure and convex suction sidewalls 42, 44. The pressure and suction sidewalls 42, 44 extend longitudinally or radially outwardly along the span S from the airfoil base 34 to the airfoil tip 36. The sidewalls also extend axially in a chordwise direction C between opposite leading and trailing edges LE, TE. The airfoil 12 is hollow with the pressure and suction sidewalls 42, 44 being spaced widthwise or laterally apart between the leading and trailing edges LE, TE to define an internal cooling cavity or circuit 54 therein for circulating pressurized cooling air or coolant flow 52 during operation. The pressurized cooling air or coolant flow 52 is from the portion of pressurized air 18 diverted from the compressor.

The turbine airfoil 12 increases in width W or widthwise from the leading edge LE to a maximum width aft therefrom and then converges to a relatively thin or sharp trailing edge TE. The size of the internal cooling circuit 54 therefore varies with the width W of the airfoil, and is relatively thin immediately forward of the trailing edge TE where the two sidewalls integrally join together and form a thin trailing edge portion 56 of the airfoil 12. Spanwise spaced apart trailing edge cooling slots 66 are provided at or near this thin trailing edge portion 56 of the airfoil 12 to cool it.

Figure 3:
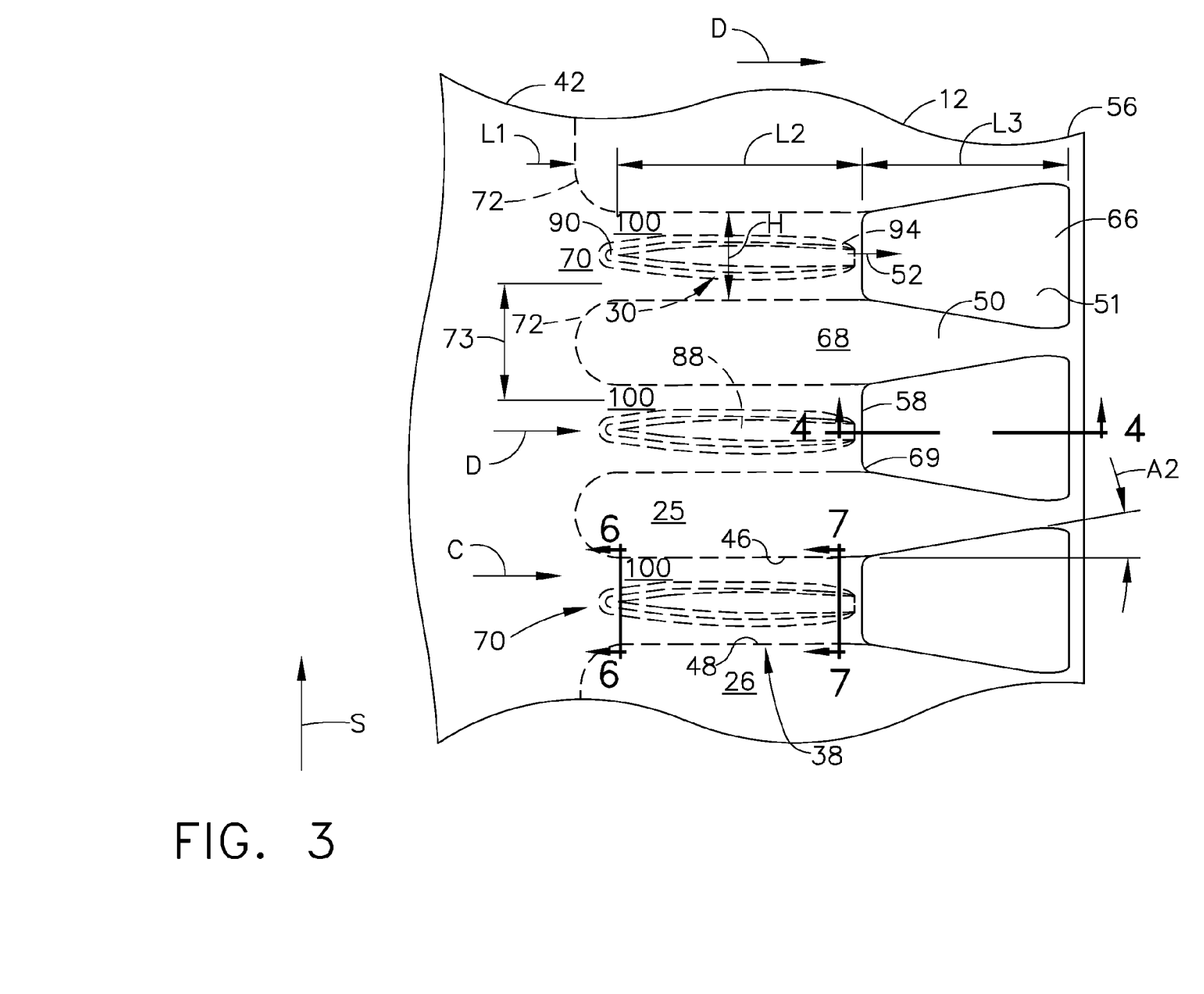
FIG. 3 is a pressure side sectional view illustration of the cooling holes leading into the trailing edge cooling slots illustrated in FIG. 2.

Referring to FIG. 3, a row 38 of spanwise spaced apart asymmetric trailing edge cooling holes 30 encased or buried and formed in the airfoil 12 between the pressure and suction sidewalls 42, 44 end at corresponding ones of the spanwise spaced apart trailing edge cooling slots 66. The trailing edge cooling slots 66 extend chordally substantially to the trailing edge TE. The trailing edge cooling holes 30 are disposed along the span S of the trailing edge TE in flow communication with the internal cooling circuit 54 for discharging the coolant flow 52 therefrom during operation.

The trailing edge cooling holes 30 are illustrated in more particularity in FIG. 3. Each cooling hole 30 includes in downstream D serial cooling flow relationship, an inlet 70, one or more asymmetric intermediate sections 101 leading into the trailing edge cooling slot 66. The embodiment of the cooling hole 30 illustrated in FIG. 3 has a downstream D converging or bellmouth shaped curved inlet 70. The embodiment of the cooling hole 30 illustrated in FIG. 3 has a single intermediate section 101 which is a metering section 100 with an asymmetric constant area flow cross section 74. The cooling hole 30 and supplies the slot with cooling air or coolant flow 52. The trailing edge cooling slot 66 begins at a breakout 58 at a downstream end 69 of the metering section 100 and the embodiment illustrated herein spanwise diverges. The cooling holes 30 are separated radially along the span S from each other by corresponding axial partitions 68 which extend downstream D toward the trailing edge TE. The curved inlet 70 is illustrated herein as downstream converging or, more particularly, a bellmouth inlet.

The inlet 70 is defined at and between forward ends 72 of the partitions 68. The partitions 68 include semi-circular forward ends 72 having diameters 73 that define the bellmouth inlet 70. Each of the cooling holes 30 includes spanwise spaced apart upper and lower hole surfaces 46, 48 along a corresponding adjacent pair of upper and lower ones 25, 26 of the axial partitions 68. A spanwise height H of the hole 30 is defined between the upper and lower hole surfaces 46, 48 of the upper and lower ones 25, 26 of the axial partitions 68 as illustrated in FIG. 3. The inlet 70, the metering section 100, and the trailing edge cooling slot 66 have downstream extending first, second, and third lengths L1, L2, and L3 respectively as illustrated in FIG. 3.

Figure 4:
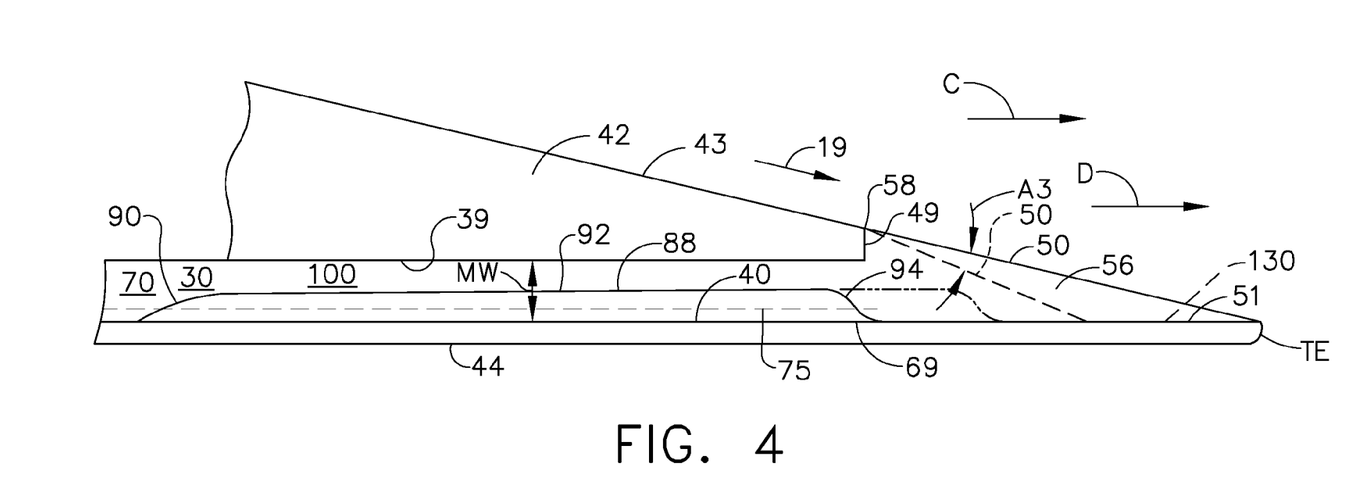
FIG. 4 is a cross sectional schematical view illustration of one of the trailing hole edge cooling holes and slots taken through 4-4 in FIG. 3.
Figure 5:
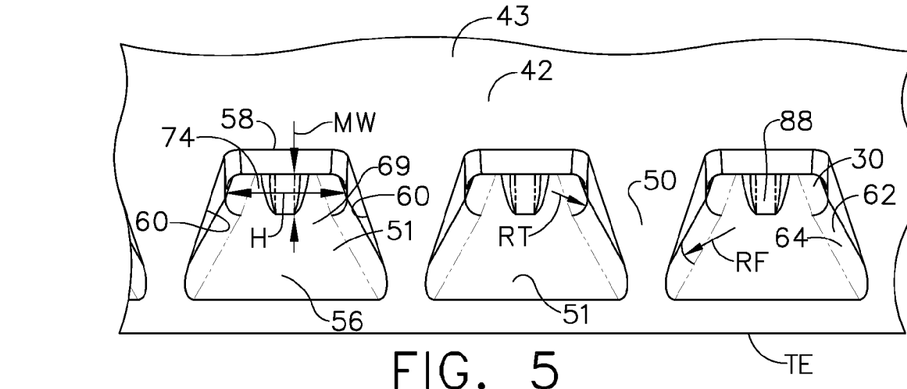
FIG. 5 is an upstream looking perspective view illustration of the trailing edge cooling holes and slots illustrated in FIG. 3.

Referring to FIGS. 3-5, a hole maximum width MW of the hole 30 is defined between pressure and suction sidewall surfaces 39, 40 of the pressure and suction sidewalls 42, 44 respectively in the hole 30 as illustrated in FIG. 4. The trailing edge cooling slots 66 include a slot floor 51 open and exposed to the hot combustion gases 19 that pass through the high pressure turbine 22. The slot floor 51 extends for the entire third length L3 along the suction sidewall 44.

Figure 6:
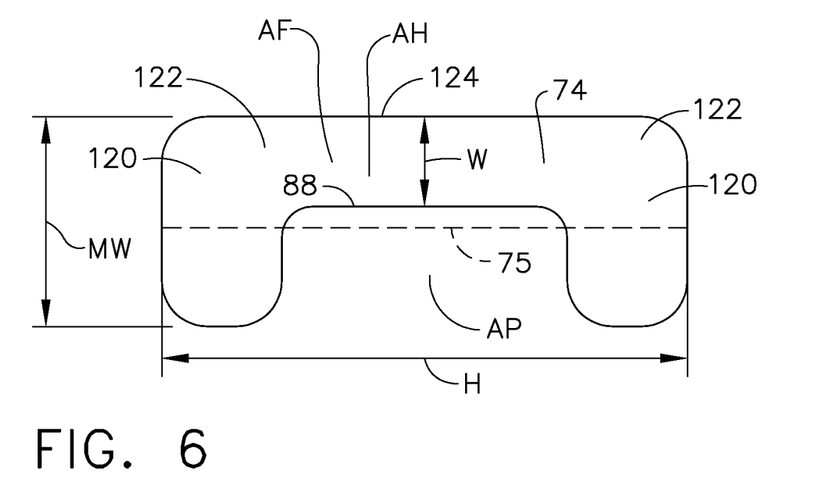
FIG. 6 is a cross sectional schematical view illustration of an asymmetrical flow cross section in the constant width metering section taken through 6-6 in FIG. 3.
Figure 7:
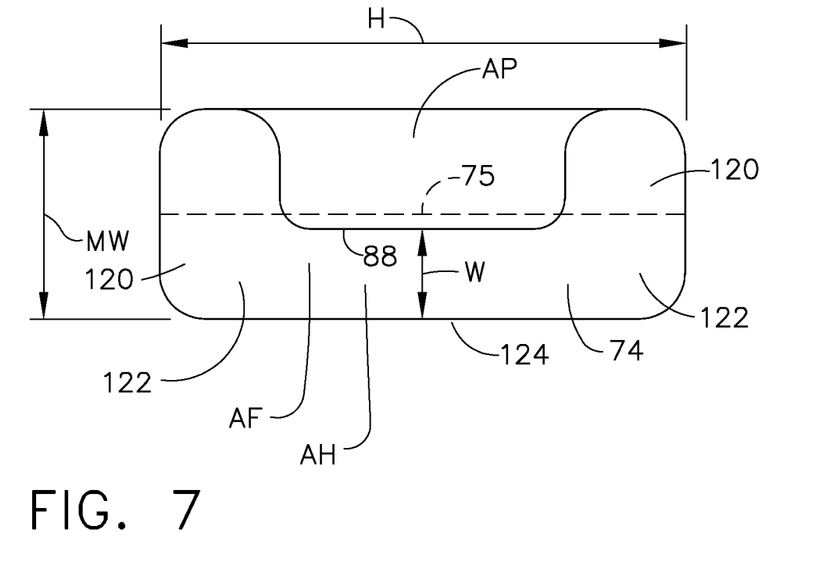
FIG. 7 is a first alternative cross sectional schematical view illustration of an asymmetrical flow cross section in the constant width metering section taken through 6-6 in FIG. 3.

The adjacent pair of upper and lower ones 25, 26 of the axial partitions 68 and the pressure and suction sidewalls 42, 44 spanwise bound the hole 30. Referring to FIGS. 6 and 7, the cooling hole 30 has an asymmetric flow cross section 74, which may be generally spanwise elongated, and the spanwise height H is substantially greater than the hole maximum width MW. The cooling hole 30 may have an exemplary height to maximum width ratio H/MW in a range of about 2:1 to 10:1 (see FIGS. 4-10). The pressure and suction sidewall surfaces 39, 40 of the pressure and suction sidewalls 42, 44 respectively widthwise bound the hole 30.

Figure 12:
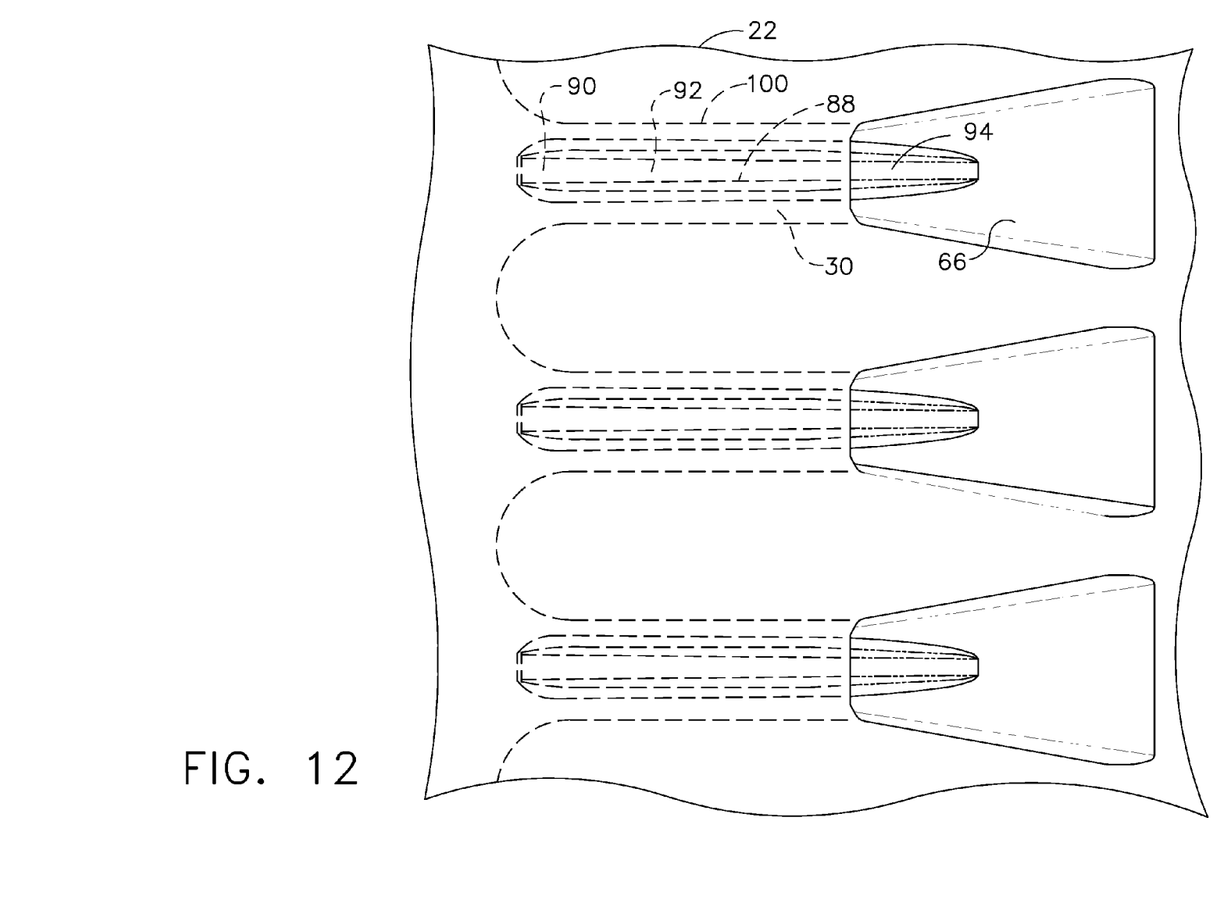
FIG. 12 is a perspective view illustration of a raised floor extension into the slot from the cooling hole illustrated in FIG. 3.

Inside the asymmetric cooling hole 30 is a raised floor 88 that provides an asymmetric constant area flow cross section 74 in the metering section 100. The constant area flow cross section 74 is asymmetric with respect to a mid-plane 75 extending axially and spanwise through the he one or more asymmetric intermediate sections 101 of the cooling hole 30 as illustrated in FIGS. 4-11. The raised floor 88 that extends downstream D starting in the inlet 70 and at least partially through the metering section 100 and may extend at least partially through the cooling slot 66 as illustrated in FIG. 12. The raised floor 88 includes in downstream serial relationship an up ramp 90 in the inlet 70, a down ramp 94 at the end of the metering section 100, and a flat transition section 92 between the up and down ramps 90, 94 in the metering section 100 which provides the asymmetric constant area flow cross section 74. The raised floor 88 including the down ramp 94 may extend into the trailing edge cooling slot 66 as illustrated in FIG. 12.

Referring to FIG. 4, the raised floor 88 rises or extends away from either the suction sidewall surface 40 of the suction sidewall 44 as illustrated in FIG. 4 or alternatively from the pressure and suction sidewall surface 39 of the pressure sidewall 42. The up ramp 90 ramps up and extends downstream D from the suction sidewall surface 40 at the end of the metering section 100. The down ramp 94 ramps down and extends downstream D from the transition section 92 to the trailing edge TE. The embodiment of the cooling hole 30 illustrated in FIG. 4 has a fixed or constant maximum width MW through the cooling hole 30 and the pressure and suction sidewall surfaces 39, 40 are parallel through the entire second lengths L1, L2 of the cooling hole 30. The pressure sidewall surface 39 is flat or planar through the entire inlet 70 and the metering section 100 and their corresponding first and second lengths L1, L2 of the cooling hole 30. In this embodiment of the cooling hole 30, the suction sidewall surface 40 is flat or planar through the entire inlet 70 and the metering section 100 and their corresponding first and second lengths L1, L2 of the cooling hole 30. The slot floor 51 is coplanar with suction sidewall surface 40 in the hole 30.

The metering sections 100 of the cooling holes 30 lead into the trailing edge cooling slots 66 which breach the external surface 43 of the pressure sidewall 42 at a breakout lip 49 spaced forward or upstream from the trailing edge TE. Each trailing edge cooling slot 66 is radially or spanwise bounded by exposed lands 50 forming the aft ends of the corresponding partitions 68, with the forward ends of the partitions extending forward or upstream toward the leading edge from the corresponding breakout lips 49. One embodiment of the lands 50, illustrated in solid line in FIG. 4, are coplanar or flush with the external surface 43 of the pressure sidewall 42 around each of the exposed cooling slot 66, including the common breakout lip 49 extending radially therebetween. This maximizes flow continuity of the pressure side of the airfoil.

Referring to FIG. 5, slot surfaces 60 extend widthwise between the lands 50 and the slot floors 51. Fillets 62 in slot corners 64 between the slot surfaces 60 and the slot floors 51 have fillet radii RF that may be substantially the same size as bottom corner radii RT of the flow cross section 74 of the metering sections 100 adjacent the bottom corner radii RT. The fillet radii RF helps with castability of the trailing edge cooling slots 66. The fillet radii RF helps improve cooling of the lands 50 by redistributing coolant flow 52 in the trailing edge cooling slots from the slot floor 51 to the lands 50 in order to make coolant flow 52 film coverage on the slot floors 51 and the lands 50 more uniformly.

Another embodiment of the lands 50 is illustrated in dashed line in FIG. 4 includes lands 50 that are not coplanar or flush with the external surface 43 of the pressure sidewall 42 around each of the exposed cooling slot 66. These shorter lands 50 are more angled towards the slot floor 51 and away from the external surface 43 of the pressure sidewall 42. The lands 50 may be angled away from the external surface 43 by a land angle A3 in a range between 0-5 degrees and the lands 50 may intercept the slot floor 51 upstream of the trailing edge TE. This shorter land embodiment of the airfoil further includes a deck 130 which in turn provides structure and a surface for the slot floor 51. The deck 130 extends chordwise or downstream from the metering sections 100 of the cooling holes 30 past the slot floors 51 substantially to the trailing edge TE.

Figure 8:
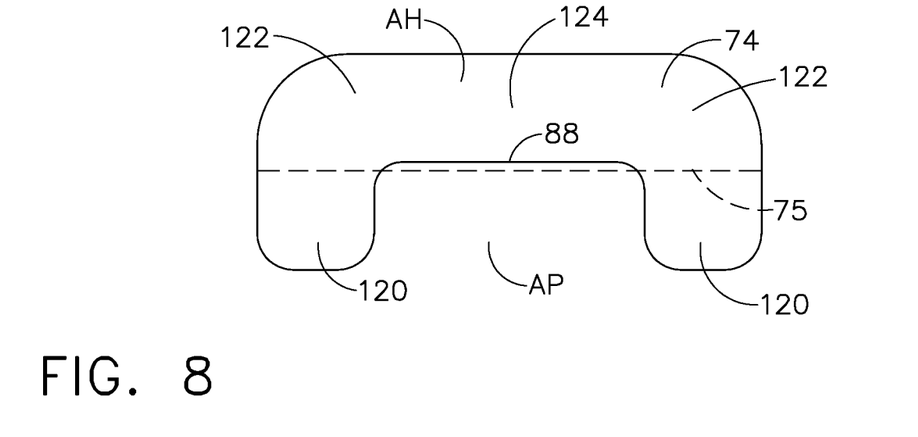
FIG. 8 is a second alternative cross sectional schematical view illustration of an asymmetrical flow cross section in the constant width metering section taken through 6-6 in FIG. 3.
Figure 9:
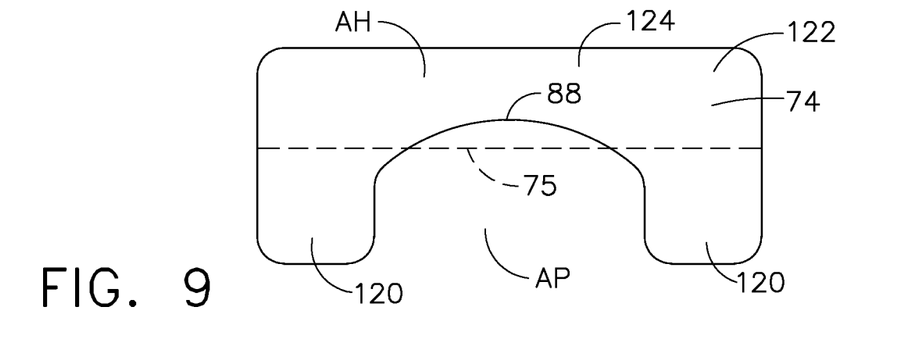
FIG. 9 is a third alternative cross sectional schematical view illustration of an asymmetrical flow cross section in the constant width metering section taken through 6-6 in FIG. 3.
Figure 10:
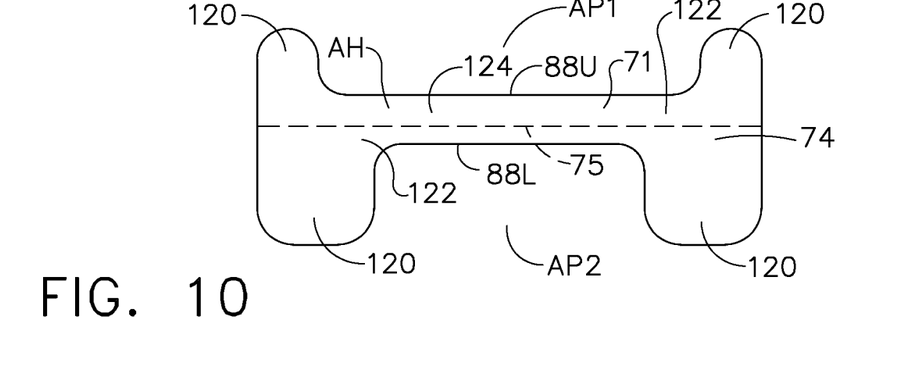
FIG. 10 is a fourth alternative cross sectional schematical view illustration of an asymmetrical flow cross section in the constant width metering section taken through 6-6 in FIG. 3.
Figure 11:
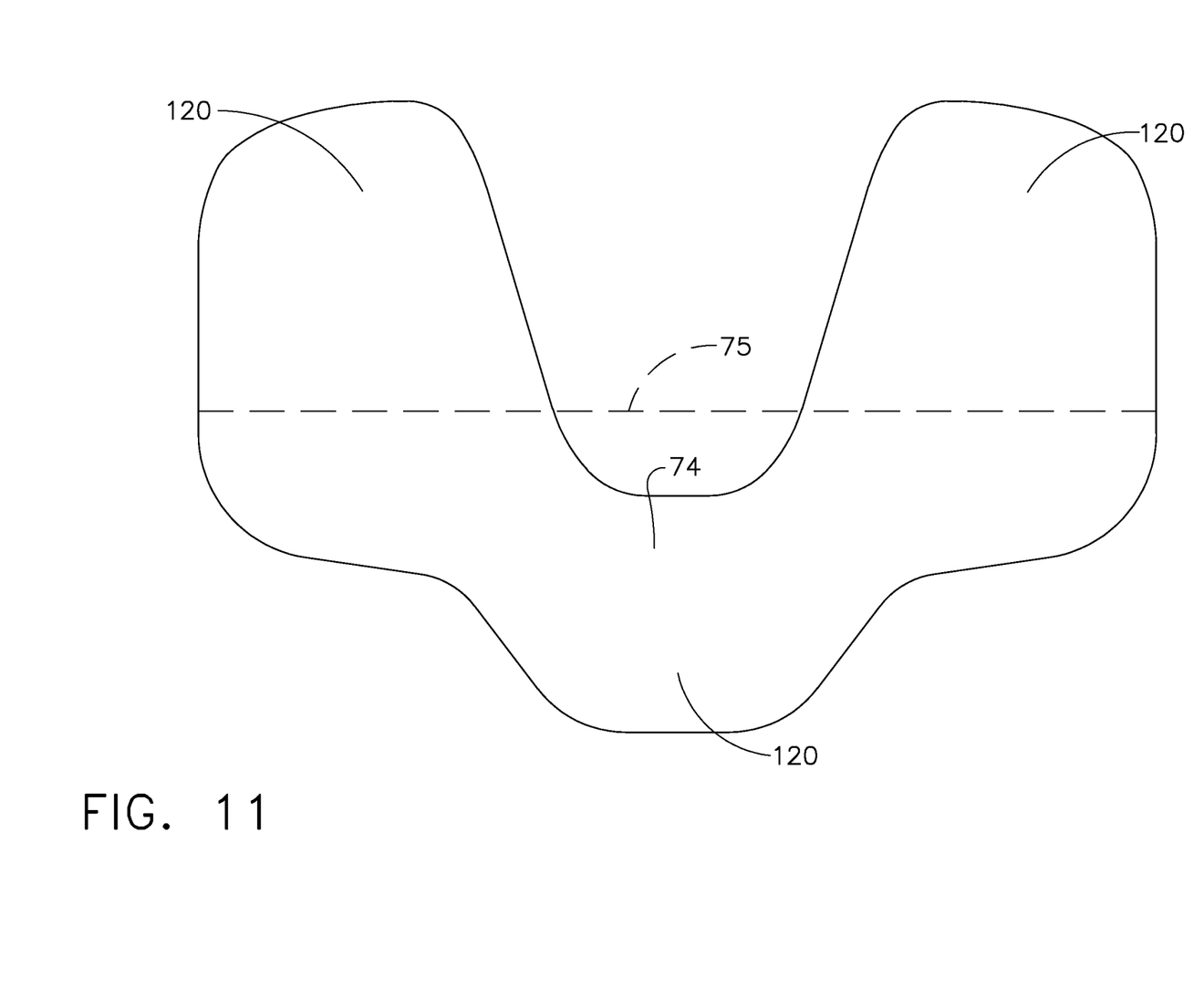
FIG. 11 is a fifth alternative cross sectional schematical view illustration of an asymmetrical flow cross section in the constant width metering section taken through 6-6 in FIG. 3.

Illustrated in FIGS. 6 and 7 are asymmetric flow cross sections 74 of the metering section 100 in the cooling holes 30. The raised floor 88 illustrated in FIG. 6 rises up from the pressure sidewall surface 39 of the pressure sidewall 42. The raised floor 88 illustrated in FIG. 7 rises up from the suction sidewall surface 40 of the suction sidewall 44. The cooling hole 30 has an asymmetric cross sectional hole area AH and the raised floor 88 has a cross sectional raised floor area AP. The flow cross section 74 between the raised floor 88 and the cooling hole 30 has a cross sectional flow area AF equal to the difference between the hole area AH and the raised floor area AP. Illustrated in FIGS. 8, 9, and 10 are other exemplary asymmetric flow cross sections 74. The asymmetric flow cross sections 74 of the metering section 100 illustrated in FIG. 10 had a middle section 71 and upper and lower raised floors 88U and 88L as well as raised floor upper and lower areas AP1 and AP2 respectively.

The embodiments of the flow cross sections 74 illustrated in FIGS. 6-10 may generally be described as having two or more lobes 120 at distal ends 122 of a middle section 124 which may be a relatively narrow rectangular middle section 124. The embodiment of the flow cross sections 74 illustrated in FIG. 11 has three lobes 120. The height H of the flow cross section 74 increases through the entire length of the metering section 100.

Different asymmetric trailing edge cooling holes 30 in the row 38 of spanwise spaced apart asymmetric trailing edge cooling holes 30 may have corresponding different asymmetric flow cross sections 74 in the asymmetric intermediate sections 101. This allows the cooling of the airfoil 22 and trailing edge TE to be tailored to localized heating and cooling requirements.

The cooling holes 30, trailing edge cooling slots 66, and lands 50 are cast in cooling features. Casting these features provides good strength, low manufacturing costs, and durability for the airfoil and blades and vanes. The asymmetrically shaped flow cross section 74 provides good cooling flow characteristics which reduces the amount of the coolant flow 52 needed to cool the airfoils. The bottom corner radii RT contribute to good cooling, castability, and strength of these cooling features and in particular help cool the lands 50 thus reducing the amount of the coolant flow 52 used.

Figure 13:
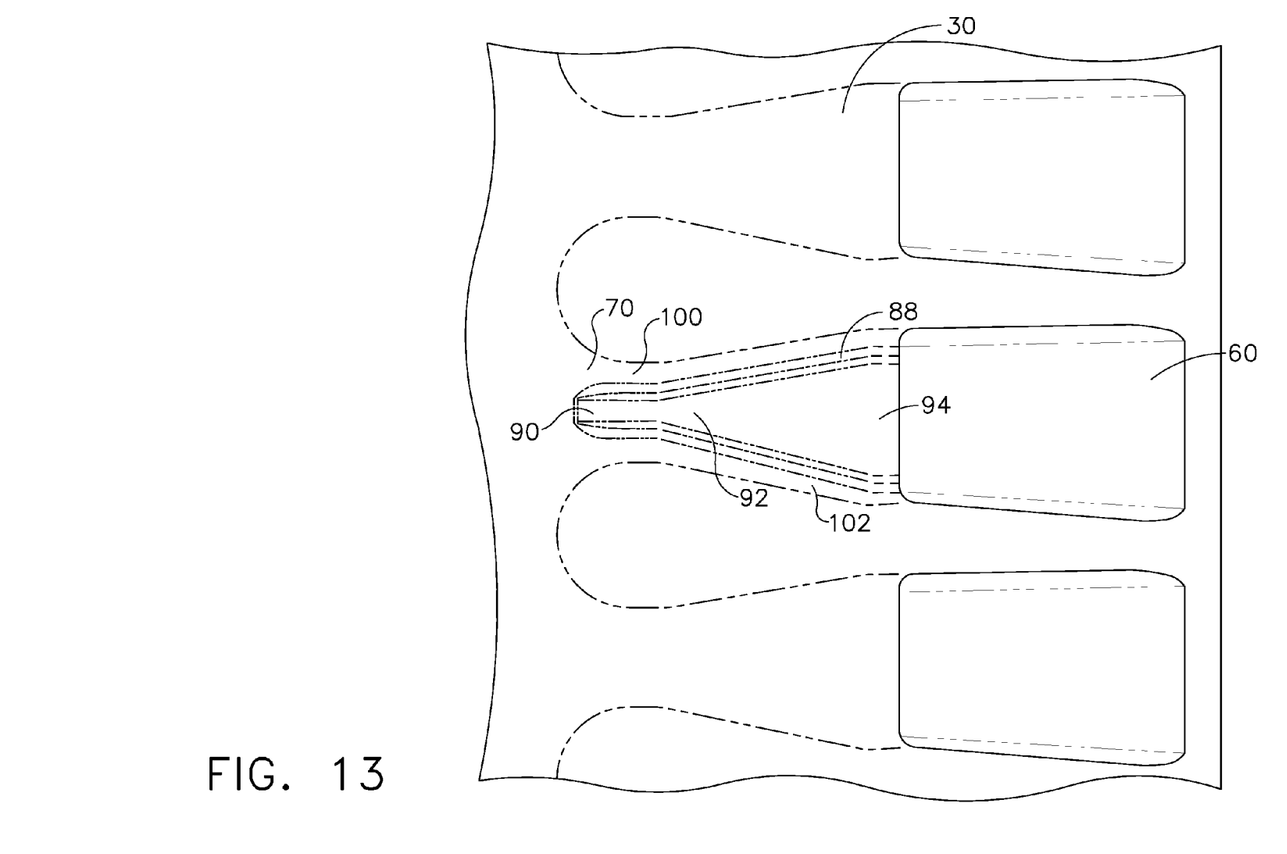
FIG. 13 is a pressure side sectional view illustration of asymmetric cooling holes having a diverging section leading into the trailing edge cooling slots illustrated in FIG. 2.

Illustrated in FIG. 13 are trailing edge cooling holes 30 having two intermediate sections 101 which include a substantially constant area section metering and spanwise diverging sections 100, 102. Each of the trailing edge cooling holes 30 includes in downstream serial cooling flow relationship, a downstream converging or bellmouth shaped curved inlet 70, the substantially constant area asymmetric flow cross section metering and spanwise diverging sections 100, 102 leading into the trailing edge cooling slot 66. Each of the trailing edge cooling holes 30 and supplies a slot 66 with cooling air or coolant flow 52. A raised floor 88 provides an asymmetric constant area flow cross section 74 in the metering and diverging sections 100, 102. The raised floor 88 includes in downstream serial relationship an up ramp 90 in the inlet 70, a down ramp 94 at the end of the metering section 100, and a flat transition section 92 between the up and down ramps 90, 94 in the metering and diverging sections 100, 102 which provides the asymmetric constant area flow cross section 74. The raised floor 88 including the down ramp 94 may extend into the edge cooling slot 66 as illustrated in FIG. 12.

The raised floor 88 contributes to forcing cooling flow from the slot floor onto the lands. This asymmetric metering section 100 produces a cooling flow restriction which is capable of significantly cooling flow area and cooling flow requirements. The asymmetrically shaped metering section of cooling hole may be greatly varied to meet design needs and may be placed on the top or bottom of the cooling hole. The asymmetrically shaped metering section of cooling hole can improve core strength by introducing an I-beam effect to reduce bending. Different asymmetric shapes of the flow cross section 74 in the metering section.

The asymmetrically shaped metering section of cooling hole addresses the problems effectively metering the airfoil trailing edge cooling flow, and simultaneously improving the airfoil trailing edge film effectiveness. Cooling flow metering is achieved at the cooling hole inlet 70, blowing ratio is reduced at the cooling hole exit to the slot 66 to maintain good slot floor film effectiveness at reduced cooling flow. Cooling film effectiveness on the slot floor is improved by better flow alignment with the edges of the land along with a smaller land surface area. The asymmetrically shaped metering section of cooling hole helps reduce turbine cooling flow, which produces better engine performance and lower SCF, along with lower peak trailing edge metal temperatures.

The metering section 100 with the constant width W is sized to control the quantity of coolant flow 52 to benefit the engine cycle. The metering section 100 expands the flow coverage at the breakout 58, redistributes coolant flow 52 in the trailing edge cooling slots 66 from the slot floor 51 to the lands 50 in order to make coolant flow 52 film coverage on the slot floors 51 and the lands 50 more uniform. The constant width W metering section 100 upstream of the diverging section 102 of the hole 30 helps keep the coolant flow 52 fully attached in the diverging section 102.

This in turn allows an increase surface area of the slot floor 51 and decrease in surface area of the lands 50. The constant width W metering section 100 and diverging section 102 helps set up a more favorable flow angle A2 at the breakout relative to the lands 50 to get more coolant flow 52 onto the lands. The planar pressure sidewall surface 39 through the entire first and second lengths L1, L2 of the cooling hole 30 also helps set up a more favorable flow angle at the breakout relative to the lands 50 to get more coolant flow 52 onto the lands.

The constant width and separately the planar pressure sidewall surface 39 of the cooling hole 30 helps keep a coolant velocity of the coolant flow 52 and a gas velocity of the hot combustion gases along the external surface 43 of the pressure sidewall 42 at the breakout about equal to minimize aero losses which could result in a negative effect on turbine efficiency. These two features also help keep the coolant flow 52 flow attached in the expansion section of the slot 66.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

Accordingly, what is desired to be secured by Letters Patent of the United States is the invention as defined and differentiated in the following claims:

1. A gas turbine engine turbine airfoil comprising:
    widthwise spaced apart pressure and suction sidewalls extending outwardly along a span from an airfoil base to an airfoil tip;
    the pressure and suction sidewalls extending chordwise between opposite leading and trailing edges;
    a spanwise row of spanwise spaced apart trailing edge cooling holes encased in the airfoil between the pressure and suction sidewalls and ending at corresponding spanwise spaced apart trailing edge cooling slots extending chordally substantially to the trailing edge;
    each of the cooling holes including one or more asymmetric intermediate sections leading into the trailing edge cooling slot;
    an asymmetric flow cross section in the one or more asymmetric intermediate sections:
    the asymmetric flow cross section being asymmetric with respect to a mid-plane extending axially and spanwise through the one or more asymmetric intermediate sections; and
    at least one raised floor extending away from one or both of the pressure or suction sidewalls and extending downstream in and at least partially through the one or more asymmetric intermediate sections or extending downstream in and at least partially through the one or more asymmetric intermediate sections and least partially through the cooling slot, the raised floor including in downstream serial relationship an up ramp, a down ramp, and a flat transition section between the up and down ramps.

2. The airfoil as claimed in claim 1 further comprising different ones of the trailing edge cooling holes in the row including different asymmetric flow cross sections in the one or more asymmetric intermediate sections of corresponding ones of the different ones of the trailing edge cooling holes.

3. The airfoil as claimed in claim 1 further comprising lands disposed between spanwise adjacent ones of the trailing edge cooling slots and slot floors in the trailing edge cooling slots between the lands.

4. The airfoil as claimed in claim 3 further comprising the lands being coplanar or flush with an external surface of the pressure sidewall around each of the cooling slots.

5. The airfoil as claimed in claim 1 further comprising each of the cooling holes including in downstream serial cooling flow relationship, an inlet of the cooling holes, the one or more asymmetric intermediate sections, and the trailing edge cooling slot and the up ramp in the inlet.

6. A gas turbine engine turbine airfoil comprising:
    widthwise spaced apart pressure and suction sidewalls extending outwardly along a span from an airfoil base to an airfoil tip;
    the pressure and suction sidewalls extending chordwise between opposite leading and trailing edges;
    a spanwise row of spanwise spaced apart trailing edge cooling holes encased in the airfoil between the pressure and suction sidewalls and ending at corresponding spanwise spaced apart trailing edge cooling slots extending chordally substantially to the trailing edge;
    each of the cooling holes including one or more asymmetric intermediate sections leading into the trailing edge cooling slot, the one or more asymmetric intermediate sections being a single intermediate section and a metering section including the asymmetric flow cross section;
    an asymmetric flow cross section in the one or more asymmetric intermediate sections:
    the asymmetric flow cross section being asymmetric with respect to a mid-plane extending axially and spanwise through the one or more asymmetric intermediate sections;
    an inlet of the cooling hole,
    each of the cooling holes including in downstream serial cooling flow relationship the inlet and the metering section, and
    at least one raised floor extending away from one or both of the pressure or suction sidewalls and extending downstream in and at least partially through the metering section or raised floor extending downstream in and at least partially through the metering section and least partially through the cooling slot, the raised floor including in downstream serial relationship an up ramp, a down ramp, and a flat transition section between the up and down ramps.

7. The airfoil as claimed in claim 6 further comprising lands disposed between spanwise adjacent ones of the trailing edge cooling slots and slot floors in the trailing edge cooling slots between the lands.

8. The airfoil as claimed in claim 7 further comprising the lands being coplanar or flush with an external surface of the pressure sidewall around each of the cooling slots.

9. A gas turbine engine turbine airfoil comprising:
    widthwise spaced apart pressure and suction sidewalls extending outwardly along a span from an airfoil base to an airfoil tip;
    the pressure and suction sidewalls extending chordwise between opposite leading and trailing edges;
    a spanwise row of spanwise spaced apart trailing edge cooling holes encased in the airfoil between the pressure and suction sidewalls and ending at corresponding spanwise spaced apart trailing edge cooling slots extending chordally substantially to the trailing edge;
    each of the cooling holes including one or more asymmetric intermediate sections leading into the trailing edge cooling slot, the one or more asymmetric intermediate sections being a single intermediate section and a metering section including the asymmetric flow cross section;
    an asymmetric flow cross section in the one or more asymmetric intermediate sections:
    the asymmetric flow cross section being asymmetric with respect to a mid-plane extending axially and spanwise through the one or more asymmetric intermediate sections;
    an inlet of the cooling hole,
    the one or more asymmetric intermediate sections including a metering section and a diverging section,
    each of the cooling holes including in downstream serial cooling flow relationship, the inlet, the metering section and the diverging section, and
    at least one raised floor extending away from one or both of the pressure or suction sidewalls and extending downstream in and at least partially through the metering section and at least partially through the diverging section or raised floor extending downstream in and at least partially through the metering section, through the diverging section and least partially through the cooling slot, the raised floor including in downstream serial relationship an up ramp, a down ramp, and a flat transition section between the up and down ramps.

10. The airfoil as claimed in claim 9 further comprising lands disposed between spanwise adjacent ones of the trailing edge cooling slots and slot floors in the trailing edge cooling slots between the lands.

11. The airfoil as claimed in claim 10 further comprising the lands being coplanar or flush with an external surface of the pressure sidewall around each of the cooling slots.

* * * * *